3,661,808
Patented May 9, 1972

3,661,808
CATALYST COMBINATION FOR POLYURETHANES
William Alvis Kennedy, Austin, Tex., assignor to Jefferson Chemical Company, Inc., Houston, Tex.
No Drawing. Filed July 31, 1970, Ser. No. 60,155
Int. Cl. C08g 22/38, 22/44
U.S. Cl. 260—2.5 AC                                   7 Claims

ABSTRACT OF THE DISCLOSURE

An excellent catalyst for polyurethanes is a combination of 4,4'-dimorpholinodiethyl ether and 1,4-dimethylpiperazine. The catalyst combination, which exhibits a much lower vapor pressure than dimethyl piperazine alone, is useful in polyether and polyester foams. Urethane foams are useful in various applications ranging from cushioning in flexibles to insulation in rigids.

CROSS-REFERENCE TO RELATED APPLICATIONS

The co-pending application of George P. Speranza and Michael Cuscurida, Ser. No. 60,087, filed of even date, teaches the use of 4,4'-dimorpholinodiethyl ether as a catalyst for polyurethane systems.

BACKGROUND OF THE INVENTION

Field of the invention

This invention pertains to the field of amine catalysts for polyurethane foam.

Description of the prior art

It is known to prepare foamed polyurethanes by the reaction of a polyisocyanate, a polyol and a blowing agent, such as a halogenated hydrocarbon, water, or both, in the presence of catalyst. The catalyst is employed to promote at least two and sometimes three major reactions that must proceed simultaneously and competitively at balanced rates during the process in order to provide a good polyurethane foam. One reaction is a chain-extending isocyanate-hydroxyl reaction by which a hydroxyl-containing molecule is reacted with an isocyanate-containing molecule to form a urethane. This increases the viscosity of the mixture and provides a polyurethane containing secondary nitrogen atoms in the urethane groups. A second reaction is a cross-linking isocyanate-urethane reaction by which an isocyanate-containing molecule reacts with a urethane group containing a secondary nitrogen atom. The third reaction is an isocyanate-water reaction, by which an isocyanate-terminated molecule is extended and by which carbon dioxide is generated to blow or assist in blowing the foam. The third reaction is not essential if an extraneous blowing agent, such as a halogenated normally liquid hydrocarbon, carbon dioxide, etc., is employed, but is essential if all, or even a part, of the gas for foam generation is to be generated by this in situ reaction (e.g., in the preparation of "one-shot" flexible polyurethane foams).

The reactions must proceed simultaneously at optimum balanced rates relative to each other in order to obtain a good foam structure. If carbon dioxide evolution is too rapid in comparison with chain extension, the foam will collapse. If chain extension is too rapid in comparison with carbon dioxide evolution, foam rise will be restricted, resulting in a high-density foam with a high percentage of poorly defined cells. The foam will not be stable in the absence of adequate cross-linking.

It has long been known that tertiary amines, such as trimethylamine, triethylamine, etc., are effective for catalyzing the second cross-linking reaction. Some of the tertiary amines are effective for catalyzing the third water-isocyanate reaction for carbon dioxide evolution. However, tertiary amines are only partially effective as catalysts for the first chain-extension reaction. To overcome this problem, the so-called "prepolymer" technique has been developed wherein a hydroxy-containing polyol component is partially reacted with the isocyanate component in order to obtain a liquid pre-polymer containing free isocyanate groups. This pre-polymer is then reacted with additional polyol in the presence of a tertiary amine to provide a foam. This method is still commonly employed in preparing rigid urethane foams, but has proven less satisfactory for the production of flexible urethane foams.

For flexible foams, a one-step or "one-shot" process has been developed wherein a tertiary amine such as triethylenediamine is employed in conjunction with an organic tin compound. Triethylenediamine is particularly active for promoting the water-isocyanate reaction, and the tin compound is particularly active in synergistic combination with the triethylenediamine for promoting the chain-extension reaction.

However, even here, the results obtained leave much to be desired. Triethylenediamine is a solid and must be dissolved to avoid processing difficulties. Also, many prior art amines tend to impart a strong amine odor to the polyurethane foam because of their low vapor pressure. No prior art catalyst performs satisfactorily in both polyether and polyester urethane foams. For instance, triethylenediamine, which is widely used in polyether foams will not process in polyester systems. Attempts to make polyester flexible foams using triethylenediamine results in closed cells and shrinkage. Some hydroxyl-containing amines, for example, dimethylaminoethanolamine, will process both polyether and polyester foams but are chemically bound in the finished foam and may tend to cause allergenic reactions. The catalyst combination of this invention overcomes the prior art problems discussed, supra.

SUMMARY OF THE INVENTION

The invention is a new amine catalyst for polyurethanes which is a combination of 4,4'-dimorpholinodiethyl ether and 1,4-dimethylpiperazine. This catalyst combination is a liquid at room temperature, has much lower volatility than many prior art amine catalysts, and also performs satisfactorily in both polyester and polyester foams. This invention is also a method for producing urethane foams using this catalyst combination.

DESCRIPTION OF THE PREFERRED EMBODIMENTS

In order to form polyurethane foams, several ingredients are essential. first, an isocyanate. The isocyanate may be difunctional such as toluene diisocyanate or the polyfunctional polyaryl isocyanates. The polyaryl isocyanates are produced by the phosgenation of the reaction product of aniline and formaldehyde. Such reactions are well known and are described in U.S. Patents 2,683,730, 3,277,173, 3,334,162 and 3,362,979, for example. The polyaryl isocyanates thus formed have functionalities greater than two which can be varied up to the higher functionality materials. In practice, however, functionalities greater than four are attained only with difficulty. However, for purposes of the practice of my invention, materials with a functionality as high as five may be used. It is preferred that the functionality be from two to about four.

The hydroxyl-containing polyol component which reacts with the isocyanate may suitably be a hydroxyl-containing polyester or polyol having a hydroxyl number ranging from about 700 to about 25, or lower. When it is desired to provide a flexible foam, the hydroxyl number is preferably in the range from about 25 to 60. For rigid foams, the hydroxyl number is preferably in the range from about 350 to 700. Semi-rigid foams of a desired flexibility are provided when the hydroxyl number is intermediate to the ranges just given.

When the polyol is a polyester, it is preferable to use, as the polyester, a resin having a relatively high hydroxyl value and a relatively low acid value. The acid component of the polyester is preferably of the dibasic or polybasic type and is usually free of reactive unsaturation, such as ethylenic groups or acetylenic groups. The unsaturation, such as occurs in the rings of such aromatic acids, a phthalic acid, terephthalic acid, isophthalic acid, or the like, is non-ethylenic and non-reactive. Thus, aromatic acids may be employed for the acid component. Aliphatic acids, such as succinic acid, adipic acid, sebacic acid, azelaic acid, etc., may be employed. The alcohol component for the polyester should preferably contain a plurality of hydroxyl groups and is preferably an aliphatic alcohol, such as ethylene glycol, propylene glycol, dipropylene glycol, diethylene glycol, glycerol, pentaerythritol, trimethylolethane, trimethylolpropane, mannitol, sorbitol, polyglucosides, etc. Mixtures of two or more of the above-identified alcohols may be employed also if desired.

When a flexible polyester urethane foam is desired, the polyol should preferably have an average functionality of from about two to about four and a molecular weight of from about 2000 to about 4000. For rigid foams, the functionality of the polyol component is preferably four or more (e.g., five to seven).

When the hydroxyl-containing component is a polyether polyol for use in flexible polyurethane, foam, the polyol may be an alkylene oxide condensate of a polyhydric alcohol with a functionality of from about two to about four. The alkylene oxide may suitably be ethylene oxide, propylene oxide, or 1,2-butylene oxide, 1,4-butylene oxide or a mixture of some or all of these. The polyol will suitably have a molecular weight within the range of from about 500 to about 7,000. For flexible polyether polyurethane foams, the alkylene oxide is preferably propylene oxide or a mixture of propylene oxide and ethylene oxide and the molecular weight is preferably within the range of about 2,000 to 4,000.

For rigid polyether polyurethane foams, the polyol should have a functionality of four or more (e.g., five to seven) and a molecular weight of from about 300 to about 1000. Polyols for rigid polyether polyurethane foams may be made in various ways including the addition of an alkylene oxide as above to a polyhydric alcohol with a functionality of from four to seven. These polyols may also be, for example, Mannich condensation products of a phenol, an alkanolamine, and formaldehyde which Mannich condensation product is then reacted with an alkylene oxide. See, for example, U.S. Patent 3,297,597.

The amount of hydroxyl-containing polyol compound to be used relative to the isocyanate compound in both polyester and polyether foams normally should be such that the isocyanato groups are present in at least an equivalent amount, and preferably, in slight excess, compared with the free hydroxyl groups. Preferably, the ingredients will be proportioned so as to provide from about 1.05 to about 1.5 mol equivalents of isocyanato groups per mol equivalent of hydroxyl groups.

When water is used, the amount of water, based on the hydroxyl compound, is suitably within the range of about 0.05 to about 0.25 mol per mol equivalent of hydroxy compound.

It is within the scope of the present invention to utilize an extraneously added inert blowing agent such as a gas or gas-producing material. For example, halogenated low-boiling hydrocarbons, such as trichloromonofluoromethane, methylene chloride, carbon dioxide, nitrogen, natural gas, etc., may be used. The inert blowing agent reduces the amount of excess isocyanate and water that is required in preparing flexible urethane foam. For a rigid foam, it is preferable to avoid the use of water and to use exclusively the extraneous blowing agent. Selection of the proper blowing agent is well within the knowledge of those skilled in the art. See, for example, U.S. Patent 3,072,082.

The catalyst combination to be used in the preparation of polyether polyurethane foams in accordance with the present invention, based on the combined weight of the hydroxyl-containing compound and polyisocyanate, is from about 0.02 to about 0.2 weight percent. The catalyst combination comprises at least 50 to 90 weight percent of 4,4'-dimorpholinodiethyl ether, the remaining portion being 1,4-dimethylpiperazine. As a catalyst with this amine combination an organic tin compound may be needed.

The organic tin compound may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from one to eight carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Conventional formulation ingredients are also employed, such as, for example, foam stabilizers also known as silicone oils or emulsifiers. The foam stabilizer may be an organic silane or siloxane. For example, compounds may be used having the formula:

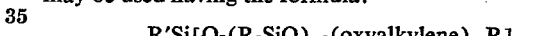

wherein R is an alkyl group containing from one to four carbon atoms; $n$ is an integer of four to eight; $m$ is an integer of 20 to 40; and the oxyalkylene groups are derived from propylene oxide and ethylene oxide. See, for example, U.S. Patent 3,194,773.

In preparing a flexible foam, the ingredients may be simultaneously, intimately mixed with each other by the so-called "one-shot" method to provide the foam by a one-step process. In this instance, water should comprise at least a part (e.g., 10% to 100%) of the blowing agent. The foregoing methods are known to those skilled in the art, as evidenced by the following publication: Du Pont Foam Bulletin, "Evaluation of Some Polyols in One-Shot Resilient Foams," Mar. 22, 1960.

When it is desired to prepare rigid foams, the method that is preferably employed is the so-called "quasi-prepolymer method," wherein the hydroxyl-containing component preferably contains from about four to seven reactive hydroxyl groups, on the average, per molecule.

In accordance with this method, a portion of the hydroxyl-containing component is reacted in the absence of a catalyst with the polyisocyanate component in proportions so as to provide from about 20% to about 40% of free isocyanato groups in the reaction product, based on the polyol. To prepare a foam, the remaining portion of the polyol is added and the two components are allowed to react in the presence of a catalytic amount of the amine catalyst combination of this invention and other appropriate additives, such as blowing agents, foam stabilizing agents, fire retardants, etc. The blowing agent (e.g., a halogenated lower aliphatic hydrocarbon), the foam-stabilizing agent, the fire retardant, etc., may be added to either the pre-polymer or remaining polyol, or both, prior to the mixing of the component, whereby at the end of the reaction a rigid polyurethane foam is provided.

Urethane elastomers and coatings may be prepared also by known techniques in accordance with the present invention. See, for example, Du Pont Bulletin PB-2, by Remington and Lorenz, entitled, "The Chemistry of Urethane Coatings."

The invention will be illustrated further with respect to the following specific examples, which are given by way of illustration and not given as limitations on the scope of this invention.

Example I.—The following data demonstrates the low vapor pressure of the catalyst combination of this invention: 70.4% 4,4'-dimorpholinodiethyl ether and 29.6% 1,4-dimethylpiperazine as compared with two other well-known polyurethane catalysts: N-ethylmorpholine and dimethylpiperazine. A surprising result was that the catalyst combination of the invention which contains dimethylpiperazine exhibited a much lower vapor pressure than dimethylpiperazine alone.

VAPOR PRESSURE, MM. HG

|  | Temperature, ° C. | | | |
|---|---|---|---|---|
|  | 40 | 60 | 80 | 100 |
| Dimethylpoperazine | 28 | 69 | 155 | 305 |
| N-ethylmorpholine | 12 | 53 | 127 | 280 |
| Catalyst combination of invention: 70.4% 4,4'-dimorpholinodiethyl ether 29.6% dimethylpiperazine | 13 | 34 | 77 | 148 |

Example II.—Using the following formulation a flexible polyether foam was prepared using as amine catalyst a combination of 70.4% 4,4'-dimorpholinodiethyl ether and 29.6% 1,4-dimethylpiperazine. All of the ingredients except the toluene diisocyanate were mixed at 5000 revolutions per minute for 15 seconds and then the toluene diisocyanate was added and the total formulation was mixed an additional five seconds. The foam was then allowed to rise. The reaction became visibly apparent 12 seconds after the toluene diisocyanate was added and the foam rose to its final height in 145 seconds. The foam appeared to be of excellent quality and had a density of 1.6 pounds per cubic foot.

Formulation: Parts by weight
```
3500 molecular weight triol _____ 100
Water _____ 4
Amine catalyst _____ 0.15
Stannous octoate _____ 0.50
Silicone oil _____ 1.0
Toluene diisocyanate _____ 43
```

Example III.—Excellent rigid polyether foam was made using the same amine catalyst combination as used in Example II. The ingredients in the following formulation were mixed all at once using a mixer at 4630 revolutions per minute for fifteen seconds. The reaction became visibly apparent 30 seconds after mixing, and the foam completed its rise in 240 seconds. The foam density was 2.3 pounds per cubic foot. The cell structure was coarse but acceptable, and the foam has 89.68% closed cells.

Formulation: Parts by weight
```
Propylene oxide adduct of sorbitol, 700 molecular weight _____ 37.6
Silicone oil _____ 0.5
Amine catalyst _____ 2.0
Trichloromonofluoromethane _____ 14.0
Polyaryl isocyanate _____ 46.5
```

Example IV.—Excellent flexible polyester polyurethane foam was made using as amine catalyst a combination of 64% dimorpholinodiethyl ether and 26% 1,4-dimethylpiperazine. The foam was made on a laboratory foam machine which poured 20 pounds per minute at a mixer speed of 5000 revolutions per minute.

Formulation: Parts by weight
```
Polyester polyol _____ 100.0
Silicone emulsifier _____ 1.0
Water _____ 3.6
Palmityl dimethyl amine _____ 0.1
Amine catalyst _____ 1.0
Toluene diisocyanate _____ 44.5
```

The reaction became visible 8 seconds after mixing and the foam readied to complete rise in 87 seconds. The following physical properties were measured on the foam according to ASTM 1564-67T.

```
Density, pounds per cubic foot _____ 1.80
25%, 4" ILD _____ 45
65%, 4" ILD _____ 84
Tensile strength, p.s.i. _____ 31
90% compression set, percent _____ 6.7
```

I claim:
1. A catalyst combination for polyurethanes which comprises
   4,4'-dimorpholinodiethyl ether and
   1,4-dimethylpiperazine.
2. A catalyst combination according to claim 1 which comprises
   50 to 90 weight percent 4,4'-dimorpholinodiethyl ether and
   50 to 10 weight percent dimethyl piperazine.
3. A catalyst combination according to claim 2 which comprises
   60 to 75 weight percent 4,4'-dimorpholinodiethyl ether and
   40 to 25 weight percent 1,4-dimethylpiperazine.
4. A method for producing a urethane which comprises reacting an organic polyisocyanate with an organic hydroxy compound in the presence of a catalytic amount of a combination of 4,4'-dimorpholinodiethyl ether and 1,4-dimethylpiperazine said organic hydroxy compound being either polyhydric alcohols or linear polyesters having terminal hydroxy groups, which polyesters are obtained from the reaction of a polycarboxylic acid with a polyhydric alcohol.
5. A method for preparing a flexible polyether polyurethane foam according to claim 4 which comprises reacting in the presence of a blowing agent toluene diisocyanate with a long chain hydroxyl-terminated condensation product of a polyhydric alcohol with alkylene oxides of 2 to 4 carbon atoms in the presence of a catalytic amount of the combination of 4,4'-dimorpholinodiethyl ether and 1,4-dimethylpiperazine, said toluene diisocyanate being employed in an amount sufficient to provide 1.0 to 1.5 mol equivalents of isocyanato groups per mol equivalent of hydroxy groups said condensation product having a molecular weight within the range of about 2000 to about 7000 and a functionality from about two to about four.
6. A method for preparing a rigid polyether polyurethane foam according to claim 4 which comprises reacting in the presence of a blowing agent a polyisocyanate with a hydroxy terminated polyether in the presence of a catalytic amount of the combination of 4,4'-dimorpholinodiethyl ether and dimethylpiperazine with a blowing agent, said polyisocyanate being employed in an amount sufficient to provide 1.00 to 1.5 mol equivalents of isocyanate groups per mol equivalent of hydroxy groups in the hydroxy terminated polyether, said polyether having from about 3 to about 7 hydroxyl groups per molecule and a hydroxyl number with range 300 to 700.
7. A method for preparing a flexible polyester polyurethane foam according to claim 4 which comprises reacting in the presence of a blowing agent a toluene diisocyanate with a hydroxy terminated condensation product of a polycarboxylic acid and a polyhydric alcohol in the presence of a catalytic amount of the combination of 4,4'-dimorpholinodiethyl ether and 1,4-dimethylpiperazine, said toluene diisocyanate being employed in an amount sufficient to provide 1.0 to 1.5 mol equivalents of isocyanato groups per mol equivalent of hydroxy groups, said condensation product having a functionality of about two to about four and a molecular weight of from about 2000 to about 4000.

(References on following page)

References Cited

UNITED STATES PATENTS

| | | | |
|---|---|---|---|
| 3,313,744 | 4/1967 | Rice | 260—2.5 |
| 3,443,976 | 5/1969 | Dodson | 106—102 |

OTHER REFERENCES

Thancat DMP (N,N'-Dimethylpiperazine), Product Data Bulletin, Jefferson Chemical Co., Jan. 1, 1965, pp. 1 and 2.

Technical Data on 1,2,4-Trimethylpiperazine, Wyandotte Chemicals Corp., Feb. 1, 1962, 1 page.

DONALD E. CZAJA, Primary Examiner

C. W. IVY, Assistant Examiner

U.S. Cl. X.R.

252—426; 260—2.5 AC, 75 NC, 77.5 AC

UNITED STATES PATENT OFFICE

CERTIFICATE OF CORRECTION

Patent No. 3,661,808                            Dated May 9, 1972

William Alvis Kennedy
Assignor to Jefferson Chemical Company, Inc.
Houston, Texas, a corporation of Delaware It is certified that errors appear in the above-identified patent and that Letters Patent are hereby corrected as shown below:

In column 1, line 38, before "catalyst" (first occurrence) should be inserted -- a --. In column 2, line 47, "polyester" (first occurrence) should read -- polyether --; column 2, line 54, "." (first occurrence) should be -- : --; column 2, line 61, "3,334,162" should read -- 3,344,162 --. In column 3, line 35, "," following "polyurethane" should be deleted. In column 5, line 1 of first table, "Dimethylpoperazine" should read "Dimethylpiperazine"; column 5, line 2 of first table, under column "40", "12" should read -- 21 --.

Signed and sealed this 26th day of September 1972.

(SEAL)
Attest:

EDWARD M. FLETCHER, JR.                     ROBERT GOTTSCHALK
Attesting Officer                                   Commissioner of Patents